US008842450B2

(12) United States Patent
Jungreis et al.

(10) Patent No.: US 8,842,450 B2
(45) Date of Patent: Sep. 23, 2014

(54) POWER CONVERTER USING MULTIPLE PHASE-SHIFTING QUASI-RESONANT CONVERTERS

(75) Inventors: Aaron Jungreis, Richardson, TX (US); Antony Brinlee, Plano, TX (US); Paul Garrity, Rockwall, TX (US)

(73) Assignee: Flextronics, AP, LLC, Broomfield, CO (US)

( * ) Notice: Subject to any disclaimer, the term of this patent is extended or adjusted under 35 U.S.C. 154(b) by 119 days.

(21) Appl. No.: 13/085,393

(22) Filed: Apr. 12, 2011

(65) Prior Publication Data

US 2012/0262953 A1     Oct. 18, 2012

(51) Int. Cl.
*H02M 3/335*     (2006.01)
*H02M 3/28*      (2006.01)
*H02M 1/00*      (2006.01)

(52) U.S. Cl.
CPC ...... *H02M 3/285* (2013.01); *H02M 2001/0058* (2013.01); *Y02B 70/1441* (2013.01)
USPC ........................................ 363/21.03; 363/65

(58) Field of Classification Search
CPC .... Y02B 70/1433; H02J 1/102; H02M 7/493; H02M 3/33507
USPC ............ 363/21.02, 21.03, 65, 71, 95, 97, 131
See application file for complete search history.

(56) References Cited

U.S. PATENT DOCUMENTS

| | | |
|---|---|---|
| 4,184,197 A | 1/1980 | Cuk et al. |
| 4,273,406 A | 6/1981 | Okagami |
| 4,370,703 A * | 1/1983 | Risberg ........................ 363/136 |
| 4,563,731 A | 1/1986 | Sato |
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

International Search Report, PCT/US2011/49438, International filed Aug. 26, 2011, 10 pages.

(Continued)

*Primary Examiner* — Gary L Laxton
*Assistant Examiner* — Alex Torres-Rivera
(74) *Attorney, Agent, or Firm* — Haverstock & Owens LLP

(57) ABSTRACT

A resonant power converter draws current from a source that provides a supply current. Multiple quasi-resonant converters are interleaved and each quasi-resonant converter receives the supply current and forms a phase-shifted current according to drive signals supplied by a controller. Each phase-shifted current includes a dead-time delay and is phase-shifted relative to the other phase-shifted currents. The dead-time delay is determined as a time value within a calculated dead-time delay range having a dead-time delay minimum and a dead-time delay maximum. The outputs of each quasi-resonant converter are added together thereby reducing the AC components of current. Two, three, or four quasi-resonant power converters can be interleaved, each forming phase-shifted currents that are phase-shifted relative to the other phase-shifted currents.

15 Claims, 11 Drawing Sheets

(56) References Cited

U.S. PATENT DOCUMENTS

| | | |
|---|---|---|
| 4,823,249 A | 4/1989 | Garcia, II |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway |
| 5,065,302 A * | 11/1991 | Kanazawa .................. 363/37 |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A * | 6/1994 | Farrington et al. ........ 363/21.03 |
| 5,365,403 A | 11/1994 | Vinciarelli et al. |
| 5,373,432 A | 12/1994 | Vollin |
| 5,442,540 A * | 8/1995 | Hua et al. .................. 363/98 |
| 5,539,630 A * | 7/1996 | Pietkiewicz et al. ............ 363/17 |
| 5,673,185 A | 9/1997 | Albach et al. |
| 5,712,772 A | 1/1998 | Telefus et al. |
| 5,790,395 A | 8/1998 | Hagen |
| 5,811,895 A | 9/1998 | Suzuki et al. |
| 5,838,554 A | 11/1998 | Lanni |
| 5,859,771 A | 1/1999 | Kniegl |
| 5,905,369 A | 5/1999 | Ishii et al. |
| 5,923,543 A | 7/1999 | Choi |
| 5,949,672 A * | 9/1999 | Bernet .......................... 363/159 |
| 6,091,611 A | 7/2000 | Lanni |
| 6,183,302 B1 | 2/2001 | Daikuhara et al. |
| 6,272,015 B1 | 8/2001 | Mangtani et al. |
| 6,275,397 B1 | 8/2001 | McClain |
| 6,323,627 B1 | 11/2001 | Schmiederer et al. |
| 6,385,059 B1 | 5/2002 | Telefus et al. |
| 6,388,897 B1 | 5/2002 | Ying |
| 6,390,854 B2 | 5/2002 | Yamamoto et al. |
| 6,452,816 B2 * | 9/2002 | Kuranuki et al. ............... 363/17 |
| 6,459,175 B1 | 10/2002 | Potega |
| 6,487,098 B2 | 11/2002 | Malik et al. |
| 6,549,409 B1 | 4/2003 | Saxelby et al. |
| 6,618,274 B2 | 9/2003 | Boylan et al. |
| 6,654,261 B2 | 11/2003 | Welches et al. |
| 6,721,192 B1 | 4/2004 | Yang et al. |
| 6,775,162 B2 | 8/2004 | Mihai et al. |
| 6,894,461 B1 | 5/2005 | Hack et al. |
| 6,899,434 B2 | 5/2005 | Morishita |
| 6,989,997 B2 * | 1/2006 | Xu et al. .......................... 363/16 |
| 7,035,126 B1 | 4/2006 | Lanni |
| 7,038,406 B2 | 5/2006 | Wilson |
| 7,095,634 B2 * | 8/2006 | Coulibaly .................. 363/21.03 |
| 7,102,251 B2 | 9/2006 | West |
| 7,139,180 B1 | 11/2006 | Herbert |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,499,301 B2 | 3/2009 | Zhou |
| 7,545,256 B2 | 6/2009 | O'Toole et al. |
| 7,564,706 B1 | 7/2009 | Herbert |
| 7,596,007 B2 * | 9/2009 | Phadke et al. .................. 363/71 |
| 7,924,578 B2 | 4/2011 | Jansen et al. |
| 8,102,678 B2 | 1/2012 | Jungreis |
| 8,213,666 B2 | 7/2012 | Groesch |
| 2002/0008963 A1 | 1/2002 | Dibene, II et al. |
| 2002/0011823 A1 | 1/2002 | Lee |
| 2002/0036200 A1 | 3/2002 | Ulrich |
| 2003/0035303 A1 | 2/2003 | Balakrishnan et al. |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0109696 A1 | 5/2006 | Ren et al. |
| 2006/0152947 A1 | 7/2006 | Baker |
| 2006/0213890 A1 | 9/2006 | Kooken et al. |
| 2007/0040516 A1 | 2/2007 | Chen |
| 2007/0051712 A1 | 3/2007 | Kooken et al. |
| 2007/0086224 A1 * | 4/2007 | Phadke et al. .................. 363/65 |
| 2007/0138971 A1 | 6/2007 | Chen |
| 2007/0247091 A1 | 10/2007 | Maiocchi |
| 2007/0247877 A1 | 10/2007 | Kwon et al. |
| 2007/0263415 A1 | 11/2007 | Jansen et al. |
| 2007/0287447 A1 | 12/2007 | Cornell |
| 2007/0298653 A1 | 12/2007 | Mahoney et al. |
| 2008/0043496 A1 | 2/2008 | Yang |
| 2008/0191667 A1 | 8/2008 | Kernahan et al. |
| 2009/0290384 A1 | 11/2009 | Jungreis |
| 2009/0290385 A1 | 11/2009 | Jungreis et al. |
| 2010/0039833 A1 | 2/2010 | Coulson et al. |
| 2010/0289466 A1 | 11/2010 | Telefus et al. |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

EE Times.com—"Team Claims Midrange Wireless Energy Transfer", by R. Colin Johnson, Nov. 6, 2007, 4 pages.

EE Times.com—"Wireless Beacon Could Recharge Consumer Devices", by R. Colin Johnson, Nov. 6, 2007, 3 pages.

Novel Zero-Voltage and Zero-Current Switching (ZVZCS) Full-Bridge PWM Converter Using Coupled Output Inductor, Sep. 2002 IEEE, by Hang-Seok Choi, pp. 641-648.

"New Architectures for Radio-Frequency dc/dc Power Conversion", Juan Rivas et al., Laboratory for Electromagnetci and Electronic Systems, Jan. 2004, Massachusetts Institute of Technology, Room 10-171, Cambridge, MA 02139, pp. 4074-4084.

"Randomized Modulation in Power Electronic Converters", Aleksander M. Stankovic, member IEEE and Hanoch Lev-Ari, vol. 90, No. 5, May 2002, pp. 782-799.

"Analysis and Special Characteristics of a Spread-Spectrum Technique for Conducted EMI Suppression", K.K. Tse, et al.,IEEE transaction on Power Electronics, vol. 15., No. 2, Mar. 2000, pp. 399-410.

* cited by examiner

POWER CONVERTER USING MULTIPLE PHASE-SHIFTING QUASI-RESONANT CONVERTERS

FIELD OF THE INVENTION

The invention relates to power converters. More particularly, the invention relates to a multi-phase resonant power converter configured to reduce high-frequency ripple.

BACKGROUND OF THE INVENTION

A power supply is a device or system that supplies electrical or other types of energy to an output load or group of loads. The term power supply can refer to a main power distribution system and other primary or secondary sources of energy. Power conversion refers to the conversion of one form of electrical power to another desired form and voltage, for example converting 115 or 230 volt alternating current (AC) supplied by a utility company to a regulated lower voltage direct current (DC) for electronic devices, referred to as AC-to-DC power conversion.

A switched-mode power supply, switching-mode power supply or SMPS, is a power supply that incorporates a switching regulator. While a linear regulator uses a transistor biased in its active region to specify an output voltage, an SMPS actively switches a transistor between full saturation and full cutoff at a high rate. The resulting rectangular waveform is then passed through a low-pass filter, typically an inductor and capacitor (LC) circuit, to achieve an approximated output voltage.

Conventional series-regulated linear power supplies maintain a constant voltage by varying their resistance to cope with input voltage changes or load current demand changes. The linear regulator tend to be inefficient. The switch mode power supply, however, uses a high frequency switch, the transistor, with varying duty cycle to maintain the output voltage. The output voltage variations caused by the switching are filtered out by the LC filter.

Linear power supplies and SMPSs can both be used to step-down a supply voltage. However, unlike a linear power supply, an SMPS can also provide a step-up function and an inverted output function. An SMPS converts an input voltage level to another level by storing the input energy temporarily and then releasing the energy to the output at a different voltage. The storage may be in either electromagnetic components, such as inductors and/or transformers, or electrostatic components, such as capacitors.

In general, an SMPS is classified as a rectifier, a voltage converter, a frequency converter, or an inverter, each according to the input and output waveforms. A rectifier has an AC input and a DC output. A frequency converter has an AC input and an AC output. An inverter has an DC input and an AC output. A voltage converter, also referred to as a current converter or DC-to-DC converter, has a DC input and a DC output.

Advantages of the SMPS over the linear power supply include smaller size, better power efficiency, and lower heat generation. Disadvantages include the fact that SMPSs are generally more complex than linear power supplies, generate high-frequency electrical noise that may need to be carefully suppressed, and have a characteristic ripple voltage at the switching frequency.

High-frequency ripple results when passing current through the transistor switches and then filtering the current with passive components. The frequency components of the ripple are dependent on both the switching frequency and the switching speeds of the semiconductor switches. The high-frequency ripple generates unwanted electromagnetic interference (EMI) and must be removed to a high degree for the converter to pass standard EMI requirements.

Conventional power converters pass EMI requirements by reducing the input and output ripple. Reduction is accomplished by the following methods: large filters, reduction of switching frequency, and/or reduction of switching speeds. Such techniques are commonly practiced in nearly all conventional power converters. However, use of each of these techniques comes with specific drawbacks. Use of large filters adds space and cost. Reduction of switching frequency increases the size of passive components and cost. Reduction of switching speeds reduces efficiency.

A variety of different DC-to-DC power converter configurations are currently in use, most of which are variations of a buck converter, a boost converter, and a buck-boost converter. Some versions of the buck converter include the push-pull converter, the forward converter, the half-bridge converter, and the full-bridge converter. A resonant power converter includes an LC circuit to shape the voltage across and the current passing through the transistor switches so that the transistor switches when either the voltage or the current is zero.

A configuration using a push-pull converter is similar to the half-bridge converter configuration except that the push-pull converter configuration center taps the primary transformer. A configuration using a full-bridge converter is similar to the half-bridge converter configuration except that the full-bridge converter includes two transistor switches coupled to each end of the transformer primary, as opposed to one end as in the half-bridge converter.

Another conventional power converter uses two interleaved hard-switched converter stages to reduce ripple. In an exemplary configuration, ripple is reduced by interleaving two boost converter power factor correction stages which are operating in critical conduction-mode. However, the interleaving of these converters only yields approximately a factor of 4 decrease in the ripple at the input of the converter. In hard-switched converters, such as critical-conduction-mode PFC (power factor correction) converters, the output is controlled via the duty cycle, not the frequency. Changes to the switching frequency have no effect on the output. It is therefore relatively easy to interleave two hard-switched converters that have slightly different component values. On the other hand, due to the tolerance of components in two resonant converters, it is extremely difficult, if not improbable, to match the resonant frequencies of those two converters making it problematic to operate the two resonant converters at a frequency equal to the resonant frequency of each one.

U.S. Pat. No. 4,695,933 is directed to a multi-phase purely sinusoidal resonant converter such that the outputs are summed. There is no mention of how to make sure all converters have the same resonant frequency. U.S. Pat. No. 6,583,999 describes a boost pre-regulator with series resonant half-bridge and also describes a boost pre-regulator followed by two-phase series resonant converter. U.S. Pat. No. 6,970,366 describes a generic multi-phase resonant converter using sinusoidal waveforms. There is no mention of how to match resonant frequencies of each section. Each of these three patents share the same deficiency. The resonant frequency of the converter is determined by values of the inductors and capacitors that form the resonant tank. In practice, values of inductance and capacitance vary around a nominal value with a tolerance, typically on the order of 5% or 10%. The resonant frequency of each converter will therefore vary. For example, in the typical case, the resonant frequency of a converter is equal to $1/(2\pi\sqrt{LC})$ so that a +5% variance in both capacitance and inductance will lead to a −5% variance in the value of resonant frequency. In each of the three patents cited above, a converter designed to operate at a predetermined switching frequency cannot be guaranteed to operate at resonance unless one or both resonant tank components (the inductor and the capacitor) are hand-selected for each unit, or unless the switching frequency is adjusted for each unit.

U.S. Pat. No. 6,487,095 is directed to a multi-phase resonant converter having a variable resonant tank that uses a tunable inductor, and a synchronous rectifier coupled to the output. In order for an inductor to be tunable, it must operate at relatively high flux densities. This is not an efficient area of operation for an inductor, so the ability to tune the inductance comes at the expense of converter efficiency.

SUMMARY OF THE INVENTION

A resonant power converter draws current from a source that provides a supply current. Multiple quasi-resonant converters are interleaved and each quasi-resonant converter receives the supply current and forms a phase-shifted current according to drive signals supplied by a controller. Each phase-shifted current includes a dead-time delay and is phase-shifted relative to the other phase-shifted currents. The dead-time delay is determined as a time value within a calculated dead-time delay range having a dead-time delay minimum and a dead-time delay maximum. In some embodiments, the dead-time delay is selected as the midpoint value of the dead-time delay range. The outputs of each quasi-resonant converter are added together thereby reducing the AC components of current. In some embodiments, two quasi-resonant power converters are interleaved, each forming phase-shifted currents that are phase-shifted 90 degrees relative to the other phase-shifted current. In other embodiments, four quasi-resonant power converters are interleaved, each phase-shifting by 45 degrees. In still other embodiments, three quasi-resonant power converters are interleaved, each phase-shifting by 60 degrees.

Reducing the input ripple by such a large factor substantially reduces the size of the electromagnetic interference (EMI) filters. Eliminating the output ripple both reduces EMI, and significantly reduces the ripple current in the bulk capacitor at the output of the converter.

In some embodiments, the transformers for the multiple interleaved power converters are wound on the same transformer core, since the sum of flux from all the power converters is substantially lower than the flux from any single power converter. The resulting multi-phase transformer is smaller than multiple individual transformers since the return flux path is reduced in size. This reduces transformer size, cost, and losses.

In one aspect, a power converter is disclosed that includes an input power supply configured to provide a supply current; a plurality of quasi-resonant converters coupled in parallel to the input power supply such that the supply current is input to each quasi-resonant converter; a controller coupled to the plurality of quasi-resonant converters, wherein the controller is configured to operate with a dead-time delay and to generate independent drive signals that include the dead-time delay, the drive signals are selectively output to each quasi-resonant converter, wherein each multiple quasi-resonant converter is configured to receive one or more of the drive signals and to form a modified supply current in response to the received one or more drive signals thereby forming a plurality of modified supply currents, wherein the modified supply current of each quasi-resonant converter includes the dead-time delay and is phase-shifted relative to each other modified supply current, further wherein the plurality of quasi-resonant converters are configured to perform a power conversion function on the plurality of modified supply currents, further wherein the dead-time delay falls in the range between $16L_M C_{OSS} f_S$ and $16L_M C_{OSS} f_S + L_{res} C_{res} V_{bus}^2/(4P_{IN}L_M)$; and an output capacitor coupled to an output side of each of the plurality of quasi-resonant converters.

In some embodiments, the value of the dead-time delay is a midpoint of the dead-time delay range. In some embodiments, each of the plurality of quasi-resonant converters is configured to operate at the same switching frequency. In some embodiments, each of the plurality of quasi-resonant converters comprises a quasi-resonant tank and a transformer. In some embodiments, at least one leg of each transformer is shared by all transformers. In some embodiments, each of the plurality of quasi-resonant converters further comprises a rectifier circuit coupled between an output side of the transformer and the output capacitor. In some embodiments, the power converter further comprising a filter coupled to the input power supply, wherein the filter is configured to receive a power supply signal and to output the supply current to each of the multiple quasi-resonant converters. In some embodiments, each quasi-resonant converter comprises one of the group consisting of a series quasi-resonance circuit, a parallel quasi-resonance circuit, and a series-parallel quasi-resonance circuit. In some embodiments, each quasi-resonant converter comprises one of the group consisting of a half-bridge quasi-resonant converter, a full-bridge quasi-resonant converter, and a push-pull quasi-resonant converter. In some embodiments, each quasi-resonant converter is configured as a buck-type converter.

In some embodiments, the multiple quasi-resonant converters comprise three quasi-resonant converters, and the plurality of modified supply currents comprise a first modified supply current formed by a first quasi-resonant converter, a second modified supply current formed by a second quasi-resonant converter and phase-shifted substantially 60 degrees relative to the first modified supply current, and a third modified supply current formed by a third quasi-resonant converter and phase-shifted substantially 120 degrees relative to the first modified supply current. In some embodiments, the multiple quasi-resonant converters comprise four quasi-resonant converters, and the plurality of modified supply currents comprise a first modified supply current formed by a first quasi-resonant converter, a second modified supply current formed by a second quasi-resonant converter and phase-shifted substantially 45 degrees relative to the first modified supply current, a third modified supply current formed by a third quasi-resonant converter and phase-shifted substantially 90 degrees relative to the first modified supply current, and a fourth modified supply current formed by a fourth quasi-resonant converter and phase-shifted substantially 135 degrees relative to the first modified supply current. In some embodiments, the multiple quasi-resonant converters comprise two quasi-resonant converters, and the plurality of modified supply currents comprise two supply currents including a first modified supply current formed by a first quasi-resonant converter, and a second modified supply current formed by a second quasi-resonant converter and phase-shifted substantially 90 degrees relative to the first supply current.

BRIEF DESCRIPTION OF THE DRAWINGS

Embodiments of the power converter are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Embodiments of the power converter are directed to a multi-phase quasi-resonant power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
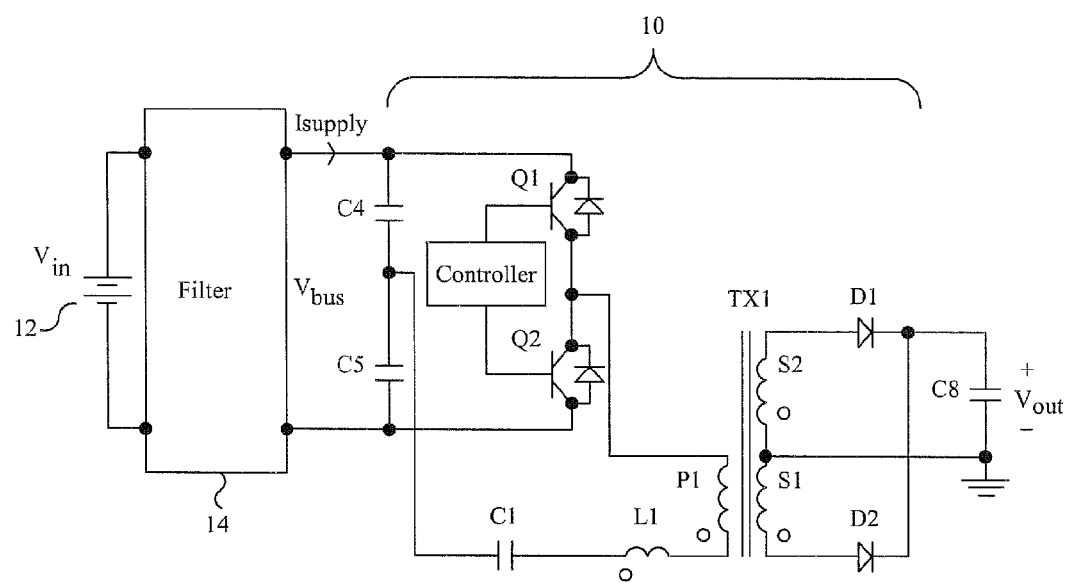
FIG. 1 illustrates an exemplary schematic diagram of a first embodiment of a power converter coupled to an input power supply and a filter.

FIG. 1 illustrates an exemplary schematic diagram of a first embodiment of a power converter coupled to an input power supply and a filter. The power converter 10 is configured as a half-bridge series quasi-resonant power converter, which is coupled to a power supply 12. The power supply 12 generates an input AC power supply voltage Vin. A filter 14 is coupled between the power supply 12 and the half-bridge power converter 10, and is configured to smooth the inherently pulsed current output from the power supply. An inductor L1, a capacitor C1, a transistor Q1, a transistor Q2, a capacitor C4, a capacitor C5, an isolation transformer TX1, a diode D1, and a diode D2 form a quasi-resonant half-bridge converter 10. The transistors Q1 and Q2 function as switches. The transistor Q1 includes a body diode DQ1, and the transistor Q2 includes a body diode DQ2. The capacitor C4 and the capacitor C5 form both the half-bridge center tap as well as input line filtering. The capacitor C4 and the capacitor C5 provide a DC block for the capacitor C1. The quasi-resonant capacitance of the half-bridge converter is the capacitance C1 in series with the parallel combination of the capacitance C4 and the capacitance C5.

The capacitor C1 and the inductor L1 are shown to be in series with the isolation transformer TX1. However, other configurations are well-established practices for operating resonant converters, such as placing the capacitor C1 across the transformer TX1 to form a parallel resonant circuit, or leaving the capacitor C1 in series with the inductor L1 and placing another capacitor across the transformer TX1 to form a series-parallel resonant circuit. Other well known configurations are also contemplated.

In some embodiments, the inductor L1 is a combination of an external inductor and a leakage inductor of the transformer TX1. In other embodiments, the inductor L1 is simply an external inductor or a leakage inductor of the transformer TX1. In some embodiments, the external inductor is a tunable inductor. Tunable inductors can be made, for example, by adding windings on both legs of an E-E core inductor and driving those windings in anti-series.

The transformer TX1 is an isolation transformer with center-tapped output. The diodes D1 and D2 provide rectification of the quasi-resonant current output from the transformer TX1. In other embodiments, the transformer TX1 is configured as a single output winding, rather than a center-tapped winding. In this case, a full-bridge rectifier is coupled to the output of the transformer TX1. While such a configuration is possible, in practice, the voltage drop across the diodes in a full bridge rectifier causes too much power loss to be practical for most high-efficiency applications, unless those diodes are replaced with synchronous MOSFETs. In some embodiments, the diodes D1 and D2 are each replaced with a metal-oxide-semiconductor field-effect transistor (MOSFET).

A controller is coupled to each transistor Q1 and Q2 and provides drive signals to the gates of each transistor. The drive signals include the dead-time delay. In some embodiments, the dead-time delay is calculated by the controller. In other embodiments, the dead-time delay is calculated during the design phase and implemented in the controller as a fixed value. In some embodiments, the transistor Q1 and the transistor Q2 are operated in a complementary fashion, each one driven with a 50% square duty cycle minus a dead-time delay. The dead-time delay is required to prevent shoot-throughs as well as to enable soft-switching. Shoot-through is defined as the condition when both transistors Q1 and Q2 are either fully or partially turned on, thereby providing a path for current to "shoot-through" from the input supply voltage Vin to ground. Soft-switching, also referred to as zero-voltage switching, uses circuit resonance to ensure that power transistors switch at or near a zero voltage level. This reduces the stress of the transistor component and also reduces the high frequency energy that would otherwise be burned as power loss.

The current flowing from the filter 14 into the converter 10 has the form of a rectified sine wave at the driving frequency of the converter. As such, the supply current output from the filter 14 has a high ripple component. The filter 14 in FIG. 1 may be large since the high-frequency ripple component is extremely high.

Figure 2A:
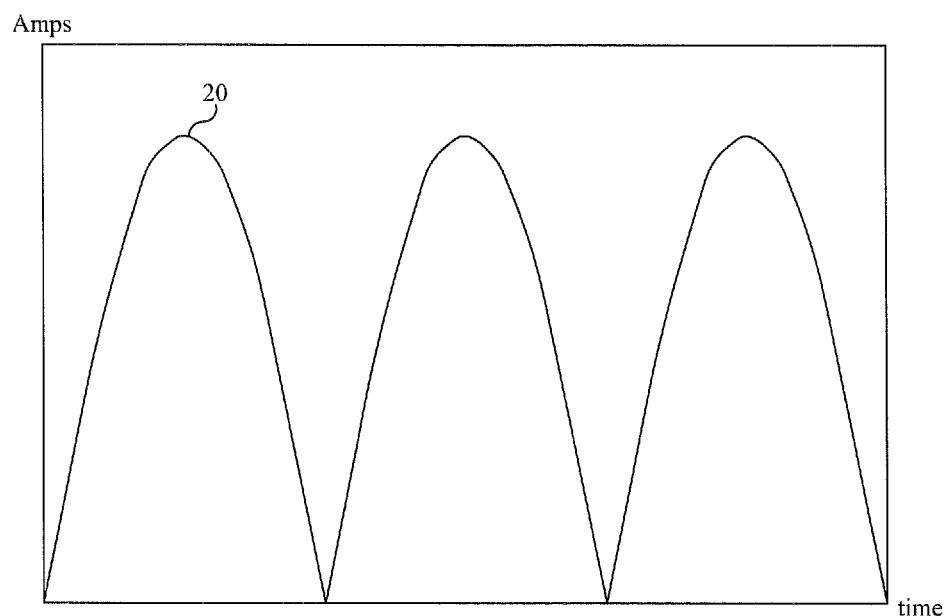
FIG. 2A illustrates a curve of an exemplary supply current flowing into the half-bridge power converter of FIG. 1.

FIG. 2A illustrates a curve of an exemplary supply current flowing into the half-bridge power converter 10 of FIG. 1. The exemplary supply current is a rectified sine wave.

The power converter 10 is operated as a quasi-resonant power converter by implementing a dead-time delay into the drive signals applied to the transistors Q1 and Q2. The quasi-resonant operation is described by way of example. The gate drive signals applied to the transistors Q1 and Q2 are square waves with duty cycles a little under 50%. In an exemplary application, the duty cycle is 46%. In this case, for 8% of the time neither transistor Q1 nor transistor Q2 are driven. By making the dead-time delay in the gate drive signals long enough, the current through the half-bridge power converter 10 drops to zero and remains at or near zero until the opposing transistor is turned on. Also, the period of the gate drive signals is set long enough so that the transistor current has enough time to rise up to its peak, drop down to zero, and then remain at or near zero for a short period of time.

A difference between quasi-resonant operation and resonant operation is that the current through the transistors Q1 and Q2 is no longer a pure sinewave. In a resonant converter, the current through the transistors Q1 and Q2 is a pure sinewave. In the quasi-resonant converter, the current through the transistors Q1 and Q2 is part of a sinewave that remains at or near zero during the zero-crossings for a short period of time. Effectively, the quasi-resonant converter utilizes a resonant tank to switch the transistors Q1 and Q2 on and off at the end of each half-sinewave, thereby generating the dead-time delay. The quasi-resonant converter operates close to the resonant frequency of the quasi-resonant switching elements Q1 and Q2.

The power converter 10 in FIG. 1 has resonant tank components L1 and C1 in series with the transformer primary P1. For discussion purposes, the tie point between the capacitor C4 and the capacitor C5 is approximated as a fixed voltage equal to half of the bus voltage Vbus, where the bus voltage Vbus is the voltage across the output terminals of the filter 14.

When the transistor Q1 is ON and the transistor Q2 is OFF, a voltage equal to half the bus voltage Vbus appears across the series combination of L1, C1, and P1. When the transistor Q2 is ON and the transistor Q1 is OFF, the voltage across the series combination of L1, C1, and P1 is the same, but of the opposite polarity.

When the power converter 10 reaches its quasi-steady-state point of operation, the output capacitor C8 is charged to a constant value of Vout. A power supply reaches quasi-steady-state operation when, for a fixed input source and output load, the pattern of currents and voltages in the circuit are identical from one switching cycle to the next. When the transistor Q1 is ON and the transistor Q2 is OFF, a voltage of Vbus−NVout appears across L1+C1, where N equals the turns ratio of the transformer TX1. This voltage causes the current through the inductor L1 and the capacitor C1 to increase from zero to some peak value, and then go back down to zero, looking like a half-sinewave. The current through the diode D1 looks the same as the current through the inductor L1 and the capacitor C1, scaled by N.

Figure 2B:
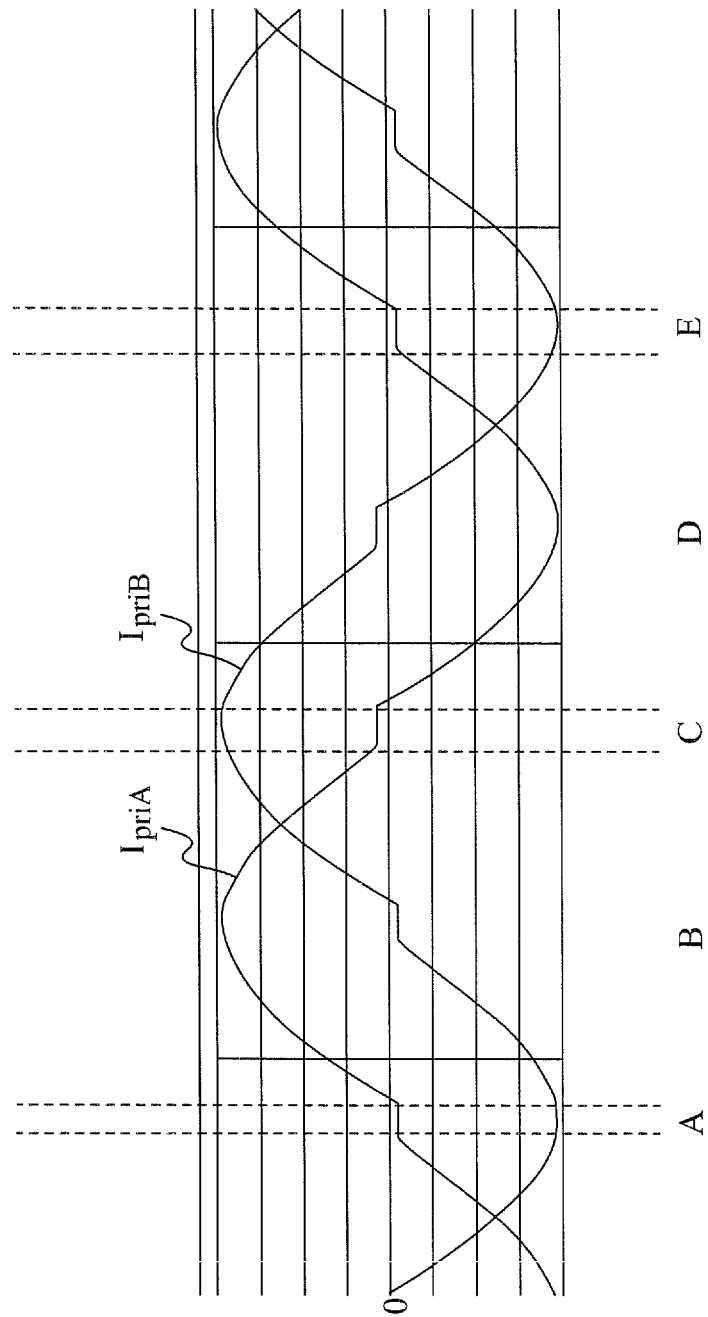
FIG. 2B illustrates an exemplary current through the inductor L1 and the capacitor C1 of the power converter 10.

FIG. 2B illustrates an exemplary current IpriA through the inductor L1 and the capacitor C1 of the power converter 10. Section B shows the current while the transistor Q1 is ON and the transistor Q2 is OFF. Section C shows the current after the transistor Q1 is turned OFF and the transistor Q2 is already OFF, and the current is forced through the body diode DQ2. The time period corresponding to section C is equal to the dead-time delay. Section D shows the current while the transistor Q1 is OFF and the transistor Q2 is ON. Section E shows the current after the transistor Q2 is turned OFF and the transistor Q2 is already OFF, and the current is forced through the body diode DQ1. The time period corresponding to section E is equal to the dead-time delay. Section A is the same as sections E.

When the current through the inductor L1 and the capacitor C1 decreases to be equal to the magnetizing current flowing in the transformer (at the transition of section B to section C or the transition of section D to section E), the net current flowing into the secondary is zero and the secondary diodes D1 and D2 turn off. At this point, the magnetizing inductance of the transformer, which is relatively large, sustains a nearly constant level of current circulating in the inductor L1 and the capacitor C1 until the opposing switch is turned on (shown in section A, C, and E). Therefore, as long as the transistor Q1 is turned OFF after the current through the inductor L1 and the capacitor C1 has reached zero, the timing of how long after the current has gone to zero is not very critical. The current through the inductor L1 and the capacitor C1 therefore looks like a half-sinewave followed by a short period of time that the current is close to zero. The fact that the converter switch (either transistor Q1 or transistor Q2) is turned off just after the current through the inductor L1 and the capacitor C1 goes to zero causes the current to look slightly lopsided, as shown in FIG. 2B.

In contrast, a true resonant converter creates a current through the inductor L1 and the capacitor C1 having a purely sinusoidal waveform. This is typically done by driving the switches at a frequency higher than resonance to guarantee that the opposing switch is OFF by the time the current has resonated down to zero. As the frequency is increased further away from resonance, the output voltage Vout decreases. Provided the converter switches operate far enough off the resonant tank frequency, small differences in value between the inductors or capacitors in interleaved converters won't matter very much. The gain of the circuit is relatively low when operated far enough off resonance.

The alternative is to drive the switches exactly at the resonant frequency of the inductor L1 and the capacitor C1. To accomplish this in practice is to either adjust the frequency once the inductor L1 and the capacitor C1 are known exactly (since all component values have some tolerance) or to choose various inductors or capacitors to match the switch-driving frequency. In the case of a single converter, either approach works, though both are costly. In the case of an interleaved converter, the inductors and capacitors are chosen so that each of the interleaved converters has exactly the same resonant frequency.

The dead-time delay is determined by calculating a dead-time delay range defined by a dead-time delay minimum and a dead-time delay maximum. The dead-time delay is the time between turning off the gate drive to one of the half-bridge switches and turning on the opposing switch. The dead-time delay must fall within specific limits, defined by the dead-time delay minimum and the dead-time delay maximum, to obtain ZVS (zero-voltage switching) of the transistor Q1 and Q2. ZVS occurs when the voltage across a transistor is zero (or approximately zero, such as 0.6V or −0.6V due to the voltage drop across the body diode of the transistor) prior to turning on the transistor. ZVS is beneficial because it eliminates switching losses and therefore allows high-efficiency operation. When a transistor in the quasi-resonant converter is switched off, the inductance in the main current path prevents an instantaneous change in current by commutating the current to the body diode of the opposing transistor. If the opposing transistor turns on while its body diode is already conducting current, ZVS is obtained. Due to capacitance in the system, the current, after being switched over to the opposing transistor, eventually resonates back to the body diode of the initial transistor. If the opposing transistor turns after the current has resonated back to the initial transistor, then there is a great deal of switching loss.

The minimum allowable dead-time is the dead-time such that the voltage across the transistor which was previously turned off has fallen to zero before turning that transistor on. In other words, the dead-time delay minimum, t_off,min, represents the minimum time of waiting between turning off one transistor and turning on the opposing transistor that is required to obtain ZVS. The maximum allowable dead-time is the time after which the voltage across the transistor which was previously off has fallen to zero and then begun to rise again. In other words, the dead-time delay maximum, t_off, max, represents the maximum time of waiting between turning off one transistor and turning on the opposing transistor that still allows operation with ZVS.

The dead-time delay minimum and the dead-time delay maximum are based on circuit operating values (bus voltage, switching frequency, maximum load power) and component values (transformer magnetizing inductance, resonant inductance, resonant capacitance, and transistor output capacitance). The only way to alter the minimum and maximum allowable dead-time is to design the half-bridge converter with other components or with a different switching frequency since the output power is application dependent and is not a variable. The component tolerances are taken care of by virtue of the fact that the allowable dead-time delay is a range of values rather than a single value. Because there is an allowable range of dead-time, as opposed to a single value, this enables compensation for slight differences between component values. In the case of multi-phase converters that interleave multiple quasi-resonant power converters, as described below, this enables compensation for slight differences between component values of the interleaved converters.

For example, based on nominal component values, suppose the dead-time delay minimum, t_off,min, is determined to be 300 ns and the dead-time delay maximum, t_off,max, is determined to be 500 ns. In this case, the controller is set to produce a dead-time delay of 400 ns. Now, if the tolerances on the components cause the actual value of t_off,min to be 250 ns and t_off,max to be 425 ns, then the controller which is set for 400 ns would still be operating the converter within the allowable range of dead-time. If the component tolerances cause the value of t_off,min to be 375 ns and t_off,max to be 585 ns, then the controller which is set for 400 ns would still be operating the converter within the allowable range of dead-time.

Figure 3:
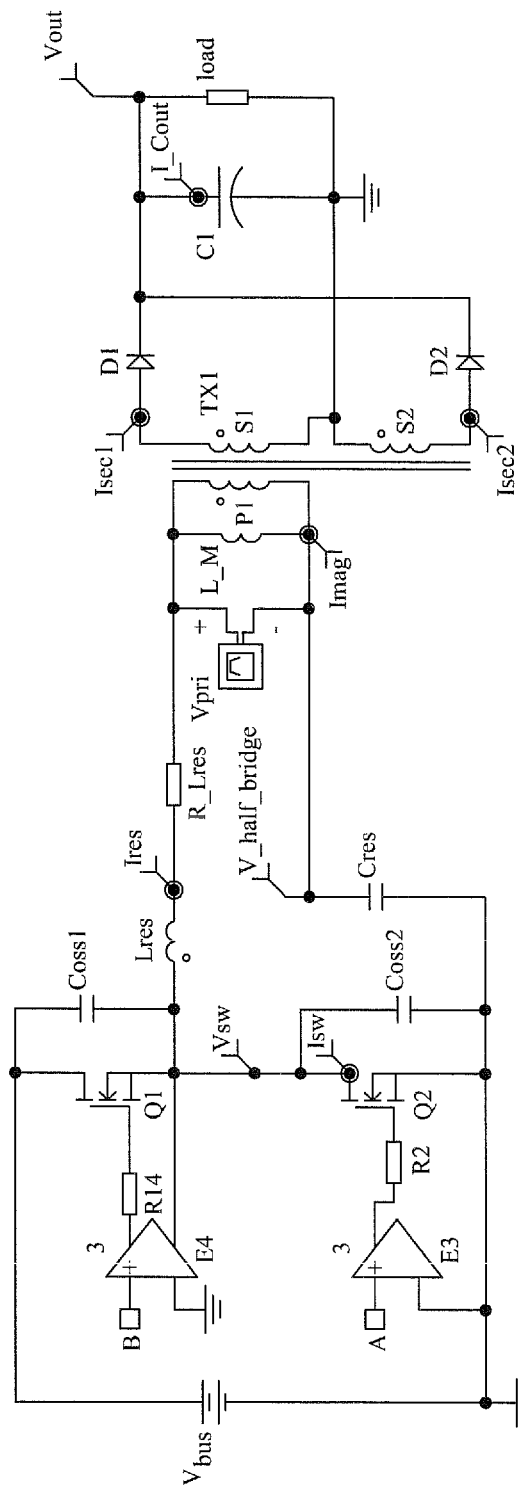
FIG. 3 illustrates a simulation schematic of an LLC ZVS single stage converter.

The following shows an embodiment for determining the dead-time delay range of an LLC ZVS single state converter. FIG. 3 illustrates a simulation schematic of an LLC ZVS single stage converter. The half-bridge converter shown in FIG. 3 is similar to the half-bridge converter shown in FIG. 1 except that the converter of FIG. 3 is configured as a series-parallel resonant circuit. The converters in both FIGS. 1 and 3 are LLC converters. In the simulation schematic of FIG. 3, the transformer is an ideal transformer and L_M models the magnetizing inductance of the transformer. In FIG. 1, the transformer shown is a real transformer that has a parallel (magnetizing) inductance. In an exemplary application, the gate drives are operated at 27,322 kHz and 43% duty cycle which corresponds to 15.8 µs ON-time and 2.5 µs OFF-time.

Figure 4:
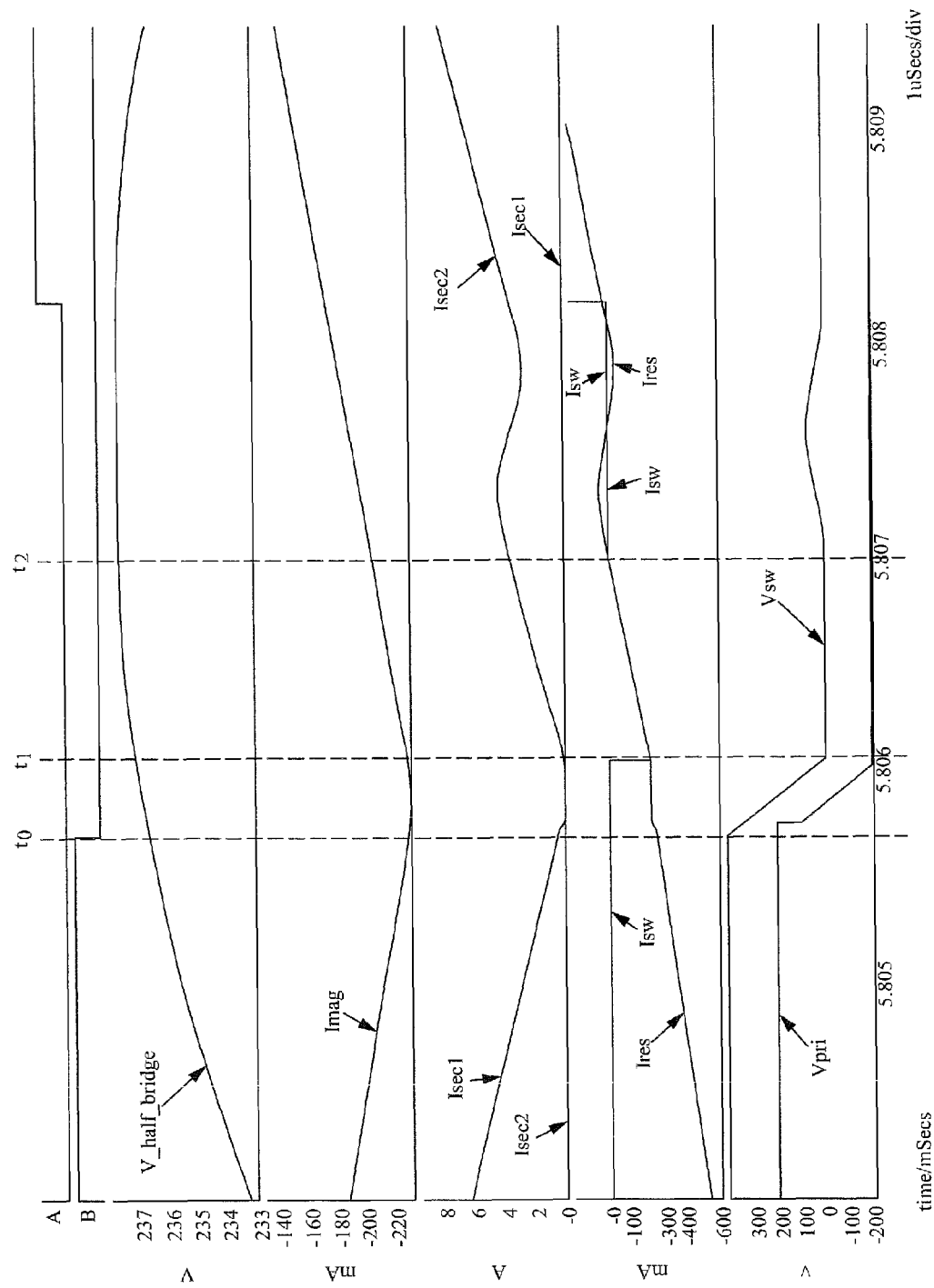
FIG. 4 illustrates exemplary waveforms as related to the converter of FIG. 3 as the transistors Q1 and Q2 are turned on and off.

FIG. 4 illustrates exemplary waveforms as related to the converter of FIG. 3 as the transistors Q1 and Q2 are turned on and off. As shown in FIG. 4, the waveforms follow the following progression:

1. At time $t_0$, Drive B shuts OFF just prior to the secondary current Isec1 going to 0. Ideal operation occurs if Drive B shuts OFF at exactly the time that the secondary current Isec1 goes to 0; however, accounting for the tolerances of the various components requires the possibility of shutting off slightly ahead of the secondary current Isec1 going to 0. If Drive B shuts off after the secondary current Isec1 goes to 0, then there would be a shoot-through where both half-bridge transistors Q1 and Q2 are conducting simultaneously.
2. Three things take place immediately following the turn-off of the gate drive of transistor Q2:
    a. The voltage Vsw (the voltage across the transistor Q2) begins to fall at a rate determined by the magnetizing current Imag in the transformer TX1 and the effective capacitance Coss1 and Coss2 of the two transistors Q1 and Q2 which also includes any parasitic capacitances or external capacitance located across transistors Q1 and Q2.
    b. The secondary-side current Isec1 quickly falls to zero since the driving voltage Vsw is also quickly decreasing. ($t_0$ to $t_1$)
    c. The magnitude of the resonant current Ires on the primary side quickly decreases until it is equal to the magnetizing current in the transformer. ($t_0$ to $t_1$). For example, the magnetizing current Imag=−230 mA and the resonant current Ires=−260 mA at t0, and the magnitude of the resonant current Ires decreases to −230 mA after t0.
3. When the secondary-side current Isec1 reaches 0 (shortly after $t_0$), (also corresponding to the resonant capacitor current Ires decreasing to the value of the magnetizing current Imag), the secondary-side diode D1 turns OFF effectively disconnecting the secondary-side from the rest of the circuit.
4. When the secondary-side becomes disconnected from the primary-side, the voltage Vpri (as measured by a differential voltage monitor) across the primary very rapidly decreases until it is equal to HB minus half of the bus voltage Vbus.
5. When the voltage Vsw reaches 0V (at $t_1$), the body diode of the opposing transistor Q1 turns ON and the magnitude of the resonant capacitor current Ires decreases from the level of the magnetizing current Imag down to zero (at $t_2$).
6. FIG. 4 shows that the resonant capacitor current Ires passes through 0A, at t2, at which point the voltage Vsw begins to rise again because the body diode of the transistor Q2 has become reverse biased and Coss1 and Coss2 provide a path for the reversing current. This operation should be avoided since it is desired that the voltage across the opposing transistor Q1 to be close to 0V when the gate drive turns ON to eliminate any switching losses.

Figure 5:
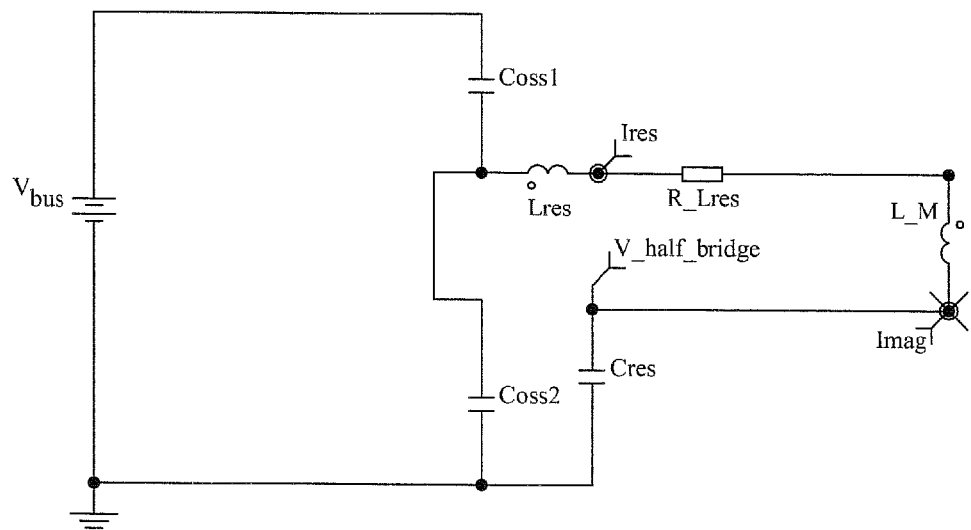
FIG. 5 illustrates a circuit equivalent of the converter in FIG. 1 between the time periods t0 and t1.
Figure 6:
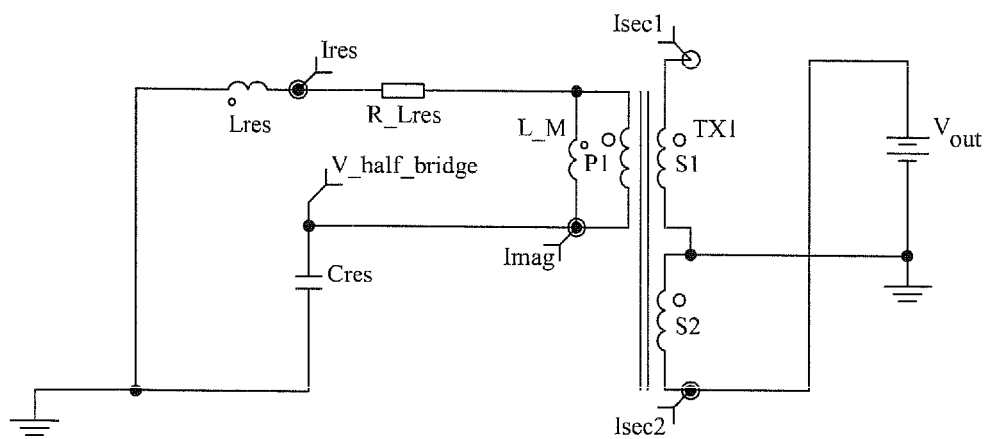
FIG. 6 illustrates a circuit equivalent of the converter in FIG. 1 between the time periods t1 and t2.

The dead-time limits are defined by the time at which the voltage Vsw falls to zero ($t_1$) until the time at which the voltage Vsw begins to rise ($t_2$). FIG. 5 illustrates a circuit equivalent of the converter in FIG. 1 between the time periods t0 and t1. FIG. 6 illustrates a circuit equivalent of the converter in FIG. 1 between the time periods t1 and t2.

The dead-time delay minimum is equal to the time required for the drain of the transistor Q2, V_half_bridge, to fall from the magnitude of voltage across the bus Vbus to 0V. The voltage V_half_bridge is driven by the magnetizing current Imag (approximated as a constant value) flowing through the parallel combination of the output capacitances of the transistors, the capacitors Coss1 and Coss2. Note that the capacitance of the resonant capacitor Cres is ignored since it is typically 2 to 4 orders of magnitude higher than the output capacitance of the transistors. The value of the transistor output capacitance Coss used in the following equations is the time-averaged value for the transistor switching over the voltage range 0V to Vbus in parallel with any external capacitance across the transistors. In the simulation results shown in FIG. 4, external values of capacitor much higher than the natural output capacitance of the transistors were added to dominate the value of overall capacitance and thereby provide a predictable model.

Since the magnetizing inductance Imag of the transformer TX1 is typically very large, the current flowing through the transistor output capacitances can be modeled as a constant during the time that the current is commutating from one transistor to another. The time required to commutate the current from one transistor to the other, which is also equal to the dead-time delay minimum t_off,min, therefore satisfies the following equation in which the current through the transformer at the time of commutation is equal to the peak magnetizing current Imag,pk and Coss represents the output transistor capacitance (including any external parallel capacitance) averaged between the two transistors Q1 and Q2 and averaged over time.

$$I_{mag,pk} = 2C_{oss}\frac{V_{bus}}{t_{off,min}} \quad (1)$$

Also, the magnetizing current is determined by the peak magnetizing inductance LM, switching frequency fs, and bus voltage Vbus:

$$\frac{\frac{V_{bus}}{2}}{L_M} = \frac{2I_{mag,pk}}{\frac{1}{2f_s}} \quad (2)$$

$$I_{mag,pk} = \frac{V_{bus}}{8L_M f_s} \quad (3)$$

Combining equations (1) and (3) gives $$2C_{oss}\frac{V_{bus}}{t_{off,min}} = \frac{V_{bus}}{8L_M f_s} \quad (4)$$

$$t_{off,min} = 16L_M C_{oss} f_s \quad (5)$$

The dead-time delay minimum t_off,min corresponds to t1 in FIG. 4 and represents the time from t0 to t1.

The difference between the dead-time delay maximum and the dead-time delay minimum is determined by the time it takes the resonant current Ires to go to 0A after the body diode of the opposing transistor Q2 has turned on. After the body diode of the opposing transistor turns on (at t1), the opposing secondary diode D2 also turns on. The voltage across the resonant inductor Lres is now the difference between the resonant capacitor DC voltage level and the reflected output voltage Vpri. The voltage across the resonant inductor Lres at this point would have been 0 had the DC voltage of the resonant capacitor Cres remained at exactly Vbus/2; however, due to the limited size of the resonant capacitor Cres, there is some ripple voltage across the resonant capacitor Cres and therefore some driving voltage across the resonant inductor Lres.

The ripple voltage on the resonant capacitor Cres can be calculated by equating the energy change due to the ripple with the input power. The change in energy $\Delta E$ in the resonant capacitor Cres from its peak voltage Vcmax to its minimum voltage Vcmin, is a function of the resonant capacitance Cres and input power Pin as shown below:

$$\Delta E = \frac{1}{2}C_{res}(V_{Cmax}^2 - V_{Cmin}^2) = \frac{P_{in}}{2f_s} \quad (6)$$

$$\Delta E = C_{res}(V_{Cmax} + V_{Cmin})\frac{(V_{Cmax} - V_{Cmin})}{2} = \frac{P_{in}}{2f_s} \quad (7)$$

Since the average capacitor voltage Vc is equal to half of the bus voltage Vbus, Equation 7 becomes $$\Delta E = C_{res}V_{bus}\frac{(V_{Cmax} - V_{Cmin})}{2} = \frac{P_{in}}{2f_s} \quad (8)$$

$$\frac{(V_{Cmax} - V_{Cmin})}{2} = \frac{P_{in}}{2f_s C_{res} V_{bus}} \quad (9)$$

The driving voltage at time t2 is half of the peak-to-peak capacitor ripple voltage which is known by Equation 9. This voltage drives the inductor current Imag to 0A from its initial value of Imag,pk.

$$\frac{(V_{Cmax} - V_{Cmin})}{2} = \frac{P_{in}}{2f_s C_{res} V_{bus}} = L_{res}\frac{I_{mag,pk}}{t_2 - t_1} \quad (10)$$

$$t_2 - t_1 = L_{res}\frac{I_{mag,pk}}{\left(\frac{P_{in}}{2f_s C_{res} V_{bus}}\right)} \quad (11)$$

$$t_2 - t_1 = \frac{2f_s L_{res} C_{res} V_{bus} I_{mag,pk}}{P_{in}} \quad (12)$$

Combining Equation 12 with Equation 3 yields:

$$t_2 - t_1 = \frac{2f_s L_{res} C_{res} V_{bus}\left(\frac{V_{bus}}{8L_M f_s}\right)}{P_{in}} \quad (13)$$

$$t_2 - t_1 = \frac{L_{res} C_{res} V_{bus}^2}{4P_{in} L_M} \quad (14)$$

To obtain ZVS, the dead-time delay minimum, which also corresponds to t1 in FIG. 4, from Equation 5 is:

$$t_{off,min} = 16L_M C_{oss} f_s \quad (5)$$

Where $L_M$ represents the magnetizing inductance of the transformer, including any parallel inductance which is added across the transformer, fs is the switching frequency, and Coss represents the average capacitance across the primary-side semiconductor switch. Note that while in most cases the value of Coss will be dominated by the parasitic output capacitance of the primary-side semiconductor switch, it will also include capacitance due to any external capacitors placed across the primary-side semiconductor switch, the reflected capacitance of the secondary-side switches, the parasitic capacitance of the transformer, and any other parasitic capacitances in the circuit which appear in parallel with the primary-side semiconductor switches.

The dead-time delay maximum corresponds to t2 in FIG. 4. From Equations 5 and 14, the dead-time delay maximum is $$t_{off,max} = 16 L_M C_{oss} f_s + \frac{L_{res} C_{res} V_{bus}^2}{4 P_{in} L_M} \qquad (15)$$

Where Coss, fs, and LM were described in the preceding paragraph, Vbus represents the DC voltage driving the primary-side of the converter, Pin represents the power into a single converter section (e.g. half of the net input power if there are two converters in parallel) and LresCres is equal to $1/(2\pi f_{res})_2$ where $f_{res}$ is equal to the resonant frequency of the resonant tank elements. The mid-point of the dead-time delay range with a full-power load is the preferred place to set the dead-time delay applied to the converter to provide the greatest likelihood that component tolerances will not move the turn-off region outside of the ZVS operating region. The mid-point of the dead-time delay range occurs at the following point:

$$t_{off,mid} = 16 L_M C_{oss} f_s + \frac{L_{res} C_{res} V_{bus}^2}{8 P_{in,max} L_M} \qquad (16)$$

A multi-phase quasi-resonant power converter includes multiple quasi-resonant converters coupled in parallel at the input and rectified to a common capacitor at the output. Each quasi-resonant converter includes a transformer. In some embodiments, each of the multiple transformers is commonly wound on a core of a multi-phase transformer. The supply current provided to the input of each of the multiple converters is phase-shifted according to the drive signals supplied to each converter, thereby forming multiple phase-shifted currents, each current phase-shifted relative to the other multiple phase-shifted currents. The multiple phase-shifted currents are added back to each other at the output, thereby reducing the current ripple within the power converter. The size of the passive filter components and the magnetic components within the power converter is reduced by reduction of current ripple and by use of a multi-phase transformer.

Figure 7:
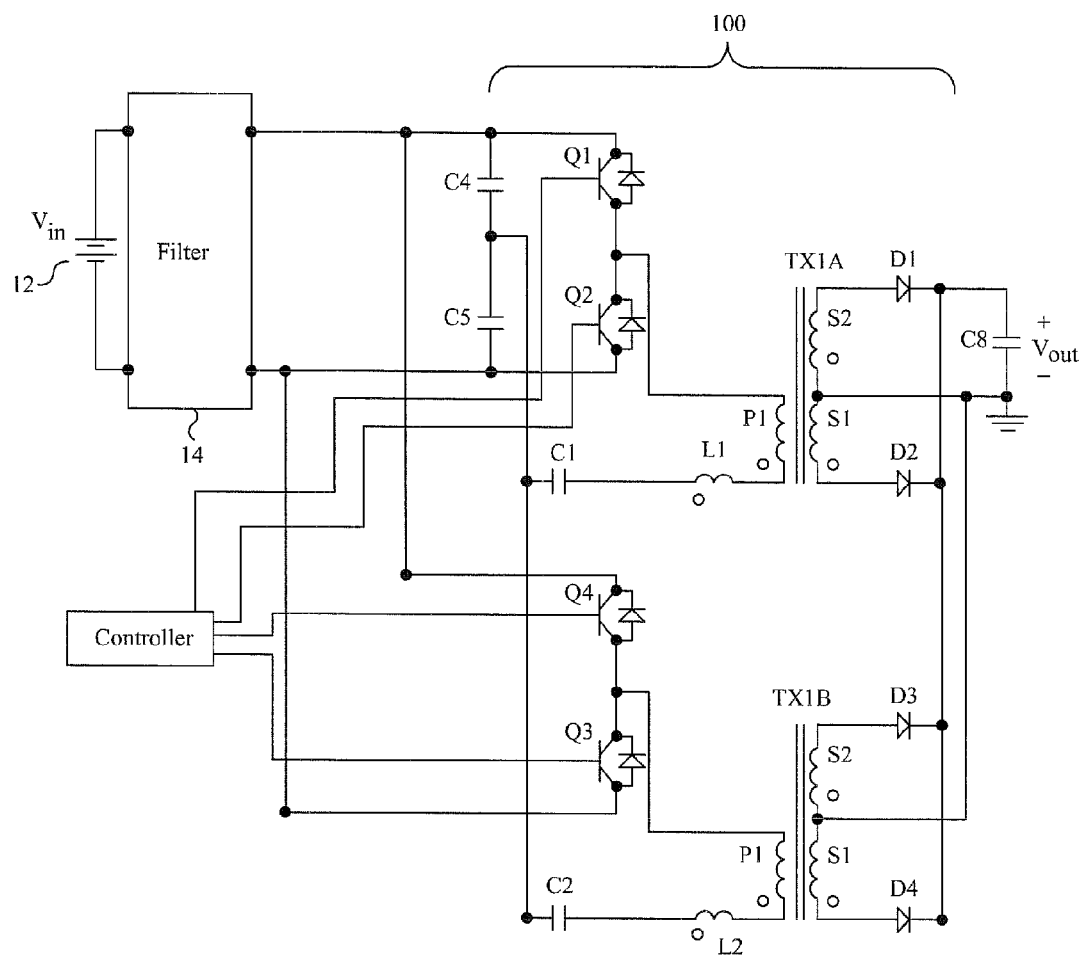
FIG. 7 illustrates an exemplary schematic diagram of an embodiment of a two-phase quasi-resonant power converter.

FIG. 7 illustrates an exemplary schematic diagram of a first embodiment of a two-phase quasi-resonant power converter of the present invention. The two-phase quasi-resonant power converter 100 shown in FIG. 7 includes two half-bridge quasi-resonant converters coupled in parallel at the input and rectified to a common capacitor at the output. Each of the two half-bridge quasi-resonant converters are the same as the power converter 10 of FIG. 1, except that the second half-bridge quasi-resonant converter is coupled to the capacitors C4 and C5 of the first half-bridge quasi-resonant converter. The power converter can be used independently, or as a part of a larger converter.

The power supply 12 generates the input supply voltage Vin. The filter 14 is coupled between the power supply 12 and the power converter 100, and is configured to smooth the inherently pulsed output of the power supply. The power converter 100 includes two half-bridge quasi-resonant converters. A first quasi-resonant converter includes the capacitors C1, C4, C5, the inductor L1, the transistor switches Q1, Q2, the transformer TX1A, and the diodes D1, D2. A second quasi-resonant converter includes the capacitors C2, C4, C5, the inductor L2, the transistor switches Q3, Q4, the transformer TX1B, and the diodes D3, D4. The outputs of each of the two quasi-resonant converts are added together and coupled in parallel to an output capacitor C8. In some embodiments, each of the transistors Q1-Q4 is a metal-oxide-semiconductor filed-effect transistor (MOSFET). In other embodiments, the transistors Q1-Q4 can be any other type of conventional semiconductor transistor. A controller supplies the gate drive signals for each of the transistors Q1-Q4. FIG. 7 shows a single controller coupled to the transistors Q1-Q4. This is merely illustrative. One or more controllers can be used to provide the independent drive signals sent to each of the individual transistors.

As shown in FIG. 7, a first terminal of a first secondary winding of the transformer TX1A is coupled to an anode of the diode D2. A second terminal of the first secondary winding is coupled to a first terminal of a second secondary winding, thereby forming a center tap of the secondary winding. The center tap is coupled to ground. A second terminal of the second secondary winding is coupled to an anode of the diode D1. A first terminal of a first secondary winding of the transformer TX1B is coupled to an anode of the diode D4. A second terminal of the first secondary winding is coupled to a first terminal of a second secondary winding, thereby forming a center tap of the secondary winding. The center tap is coupled to ground. A second terminal of the second secondary winding is coupled to an anode of the diode D3. A cathode of each of the diodes D1-D4 are each coupled to a first terminal of the output capacitor C8. A second terminal of the output capacitor C8 is coupled to ground.

The inductor L1, the capacitor C1, and the parallel inductance of the isolation transformer TX1A form a quasi-resonant tank circuit within the first quasi-resonant converter. Similarly, the inductor L2, the capacitor C2, and the parallel inductance of the isolation transformer TX1B form a quasi-resonant tank circuit within the second quasi-resonant converter. Within each quasi-resonant tank circuit, the inductive reactance and the capacitive reactance are equal, thereby establishing a quasi-resonant condition. The capacitor C4 and the capacitor C5 provide a DC block for the capacitors C1 and C2. The quasi-resonant capacitance of the first quasi-resonant converter is the capacitance C1 in series with the parallel combination of the capacitance C4 and the capacitance C5. Similarly, the quasi-resonant capacitance of the second quasi-resonant converter is the capacitance C2 in series with the parallel combination of the capacitance C4 and the capacitance C5. In some embodiments, the inductor L1 is the leakage inductance of the transformer TX1A, and the inductor L2 is the leakage inductance of the transformer TX1B.

Figure 8:
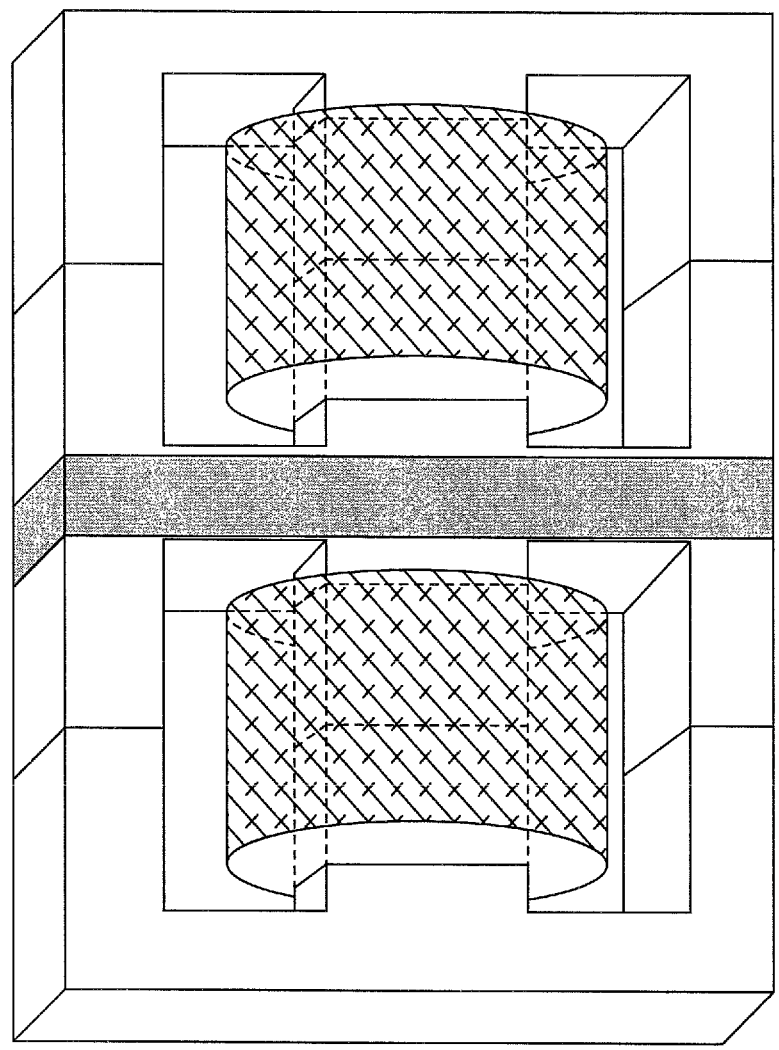
FIG. 8 illustrates an exemplary configuration of two transformer cores having a shared leg.

The flux through the transformers TX1A and TX1B adds to zero since each transformer has a sinusoidal flux phase shifted from each adjacently coupled transformer by 90 degrees. It is therefore possible to wind the two transformers TX1A and TX1B on a single two-phase transformer core, thus reducing the size of the transformer. FIG. 8 illustrates an exemplary configuration of two transformer cores having a shared leg. The shared leg is shaded in FIG. 8. The shared leg is larger than the corresponding legs if the two transformers are not shared. The sum of the flux in the first core and the second core has the same peak value as that of either core leg individually.

The current through the filter 10 in FIG. 7 has a much lower ripple component than the current through the filter 10 in FIG. 1. Furthermore, the ripple current in the filter 10 in FIG. 7 has a fundamental frequency component which is higher than the fundamental frequency component of the filter 10 in FIG. 1. The size of the filter 10 in FIG. 7 is therefore significantly smaller than the filter size in FIG. 1. Furthermore, the ripple current in the output capacitor C8 is significantly reduced in the power converter of FIG. 7 compared to the power converter of FIG. 1, thus enabling the use of much smaller values of capacitance and leading to higher lifetimes of the capacitors. The capacitors C4 and C5 also have reduced ripple current in FIG. 7 compared with FIG. 1.

The supply current, such as the current 20 shown in FIG. 2A, is supplied to each of the two half-bridge quasi-resonant converters of the power converter 100. The first half-bridge quasi-resonant converter forms a first phase-shifted current, such as current IpriA in FIG. 2B, that flows through the primary of the transformer TX1A, and the second half-bridge quasi-resonant converter forms a second phase-shifted current, such as current IpriB in FIG. 2B, that flows through the primary of the transformer TX1A. The first phase-shifted current is phase-shifted relative to the second phase-shifted current by 90 degrees. Both the first phase-shifted current and the second phase-shifted current include the dead-time delay. The gate drive signals provided by the controller include the dead-time delay and the phase shift, if any, that form the phase-shifted current. In practice, the first phase-shifted current may not be phase-shifted relative to the supply current input to the converter 100, and the label "phase-shifted" is used to indicate some manner of modification has been done to the supply current, such as introduction of the dead-time delay.

In general, resonant converters can be operated at frequencies other than the resonant frequency. Changing the frequency off-resonance reduces the power transfer and provides a method of regulating the output across the entire load range. In operation of the power converter 100, each of the quasi-resonant converters are operated near resonance, effectively creating a "DC Transformer" in which the output and input are isolated from each other, but the ratio of output voltage to input voltage is fixed. The power converter uses multiple interleaved LLC quasi-resonant converters operating as DC transformers, as well as the dead-time delay to overcome the tolerance problems created when operating multiple converters with different resonant frequencies at the same switching frequency.

The multi-phase quasi-resonant power converter described in relation to FIG. 7 is a two-phase quasi-resonant power converter. In other embodiments, the multi-phase quasi-resonant power converter is configured as a three-phase quasi-resonant power converter or a four-phase quasi-resonant power converter.

Figure 9:
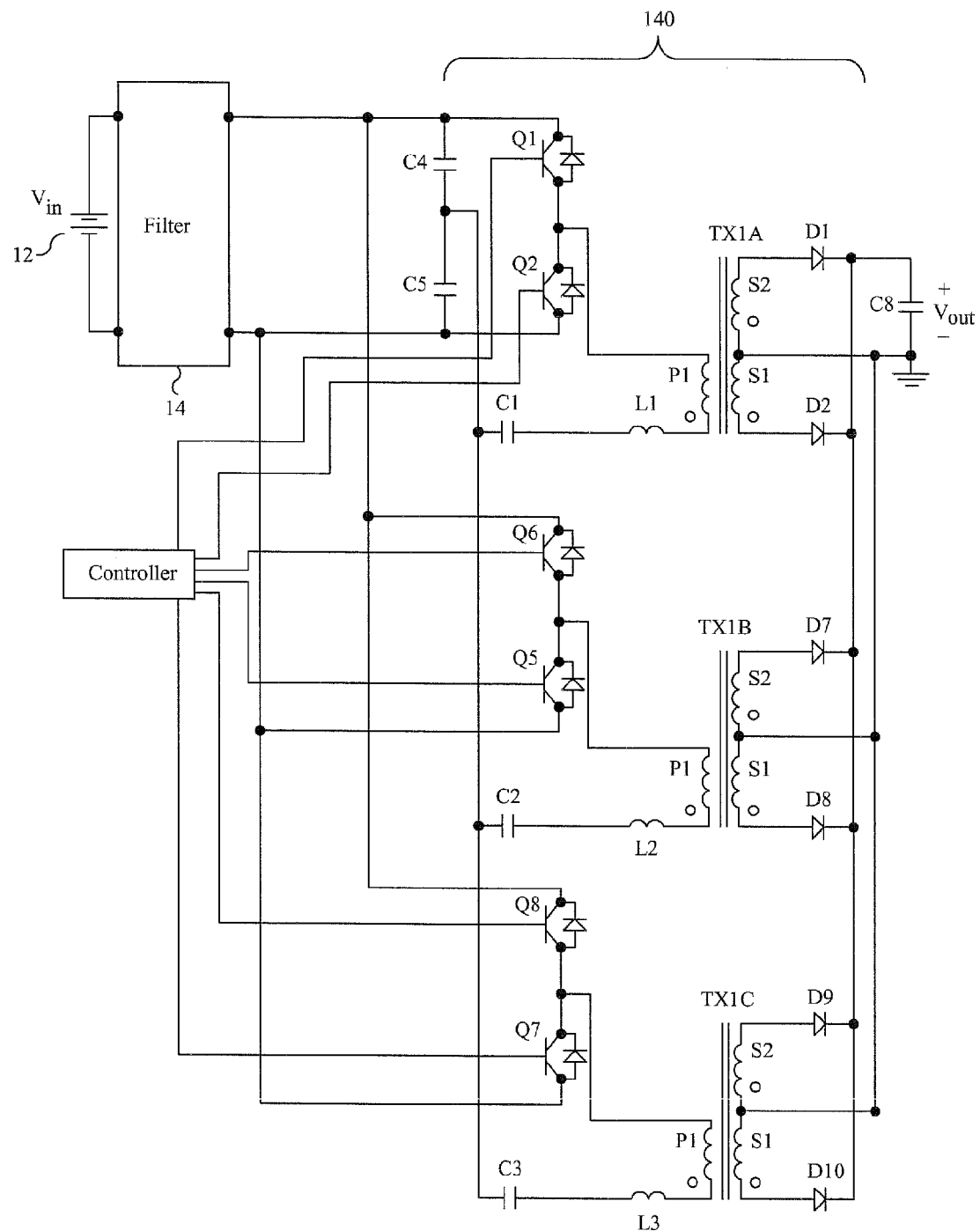
FIG. 9 illustrates an exemplary schematic diagram of an embodiment of a three-phase quasi-resonant power converter.

FIG. 9 illustrates an exemplary schematic diagram of an embodiment of a three-phase quasi-resonant power converter. The three-phase quasi-resonant power converter 140 is configured similarly as the two phase quasi-resonant power converter 100 in FIG. 7 except that three half-bridge quasi-resonant converters are used. In the three-phase quasi-resonant power converter 140, the phase-shifted current formed in the second quasi-resonant converter is phase-shifted 60 degrees relative to the phase-shifted current formed in the first quasi-resonant converter, and the phase-shifted current formed in the third quasi-resonant converter is phase-shifted 60 degrees relative to the phase-shifted current formed in the second quasi-resonant converter and phase-shifted 120 degrees relative to the phase-shifted current formed in the first quasi-resonant converter.

Figure 10:
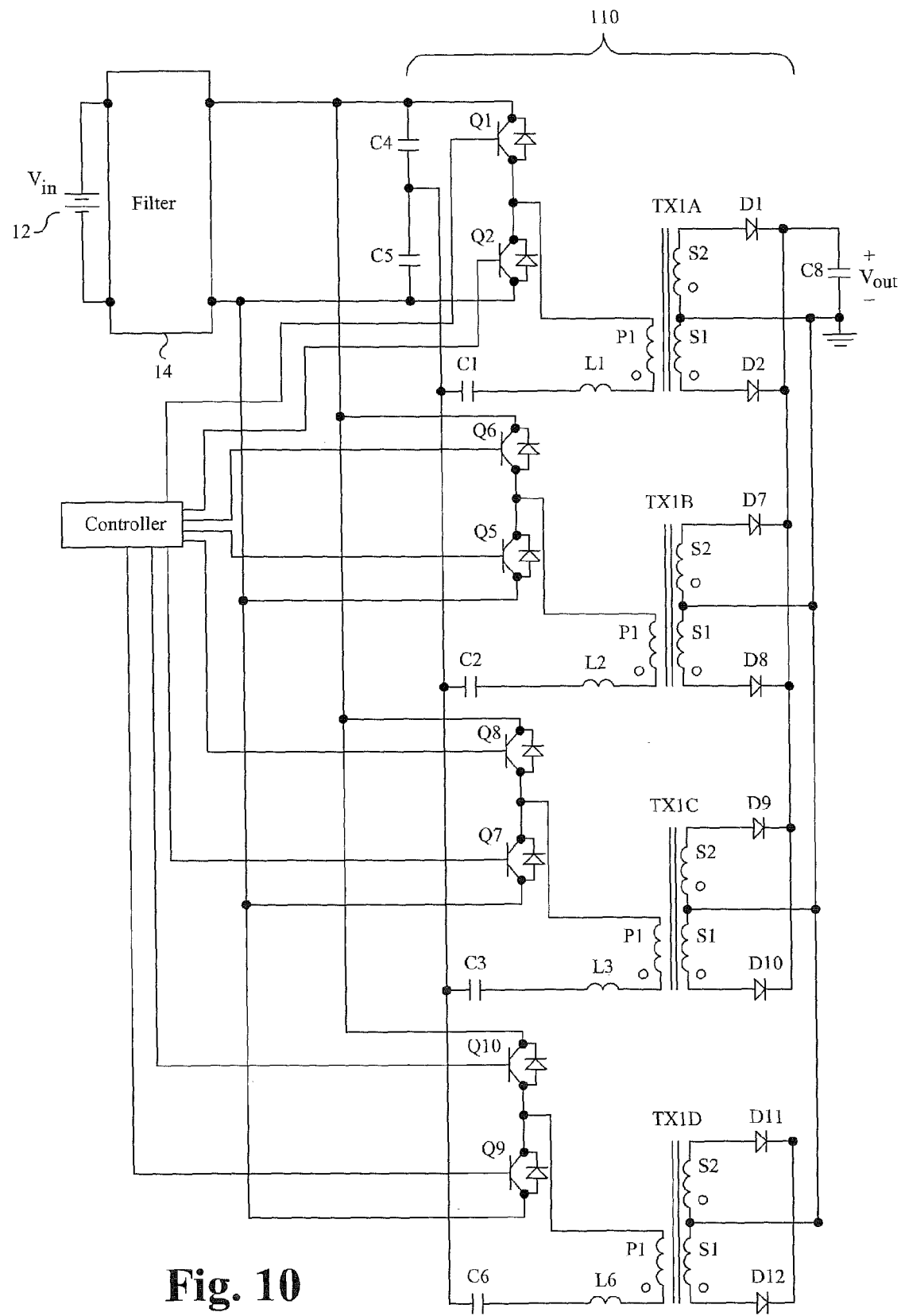
FIG. 10 illustrates an exemplary schematic diagram of an embodiment of a four-phase quasi-resonant power converter.

FIG. 10 illustrates an exemplary schematic diagram of an embodiment of a four-phase quasi-resonant power converter. The four-phase quasi-resonant power converter 110 is configured similarly as the two phase quasi-resonant power converter 100 in FIG. 7 except that four half-bridge quasi-resonant converters are used. In the four-phase quasi-resonant power converter 110, the phase-shifted currents formed in the quasi-resonant converters are phase-shifted 90 degrees relative to each other.

The concepts described above have been applied to half-bridge converters. Alternatively, the concepts can be applied to alternative types of converters. A configuration using a push-pull converter is similar to the half-bridge converter configuration of FIG. 1 except that the push-pull converter configuration center taps the primary transformer. A configuration using a full-bridge converter is similar to the half-bridge converter configuration of FIG. 1 except that the full-bridge converter includes two transistor switches coupled to each end of the transformer primary.

Figure 11:
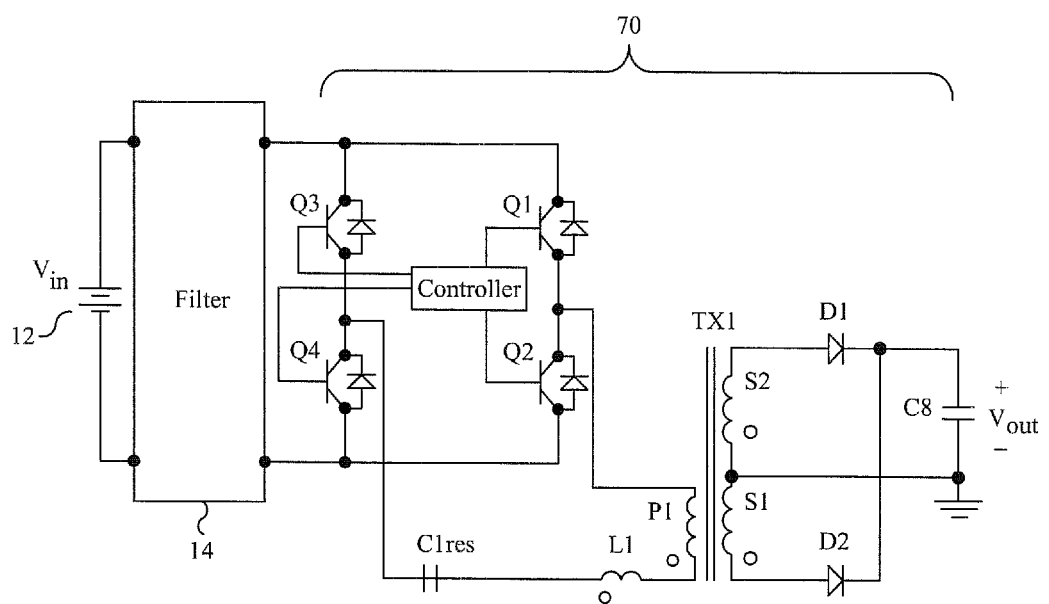
FIG. 11 illustrates an exemplary schematic diagram of an embodiment of a full-bridge quasi-resonant power converter.

FIG. 11 illustrates an exemplary schematic diagram of an embodiment of a full-bridge quasi-resonant power converter. The full-bridge quasi-resonant power converter 70 is configured similarly as the half-bridge quasi-resonant power converter 10 in FIG. 1 except that the capacitor C4 is replaced with a transistor Q3, and the capacitor C5 is replaced with a transistor Q4. The function of the two capacitors C4 and C5 (FIG. 1) is incorporated into the quasi-resonant capacitor C1$res$ of FIG. 11. So the DC bias that is blocked by the capacitors C4 and C5 (FIG. 3) is added to the quasi-resonant capacitor C1$res$, as well as the AC component. It is understood that each of the multi-phase quasi-resonant power converters described above can be configured using the full-bridge quasi-resonant converter 70 in FIG. 11.

Although the quasi-resonant converters are described above as a parallel quasi-resonant topology, it is contemplated that the topologies can be configured using parallel quasi-resonant, series-parallel quasi-resonant, LLC quasi-resonant, or any other type of full quasi-resonant topology.

In operation, the power converter can be configured to turn off phases at smaller loads in order to increase efficiency. The actual turn-off point varies from one converter to another to maximize the efficiency over the entire load range. In some embodiments, the turn-off point is 40% load. Many efficiency standards require meeting specific efficiency targets at certain load points such as 100% load, 50% load, and 20% load. Other standards take an average efficiency at 25%, 50%, 75%, and 100% load. Converter design for efficiency typically maximizes efficiency at 20%, 25%, 50%, 75%, and 100% load points since this provides the best average efficiency, as well as meeting specific efficiency targets for standards that require the specific target points. Turning off one of two interleaved converters increases resistive loss while decreasing overhead operation losses (e.g. gate drive of transistors) and some switching losses. It is typical for a best trade-off in efficiency to occur somewhere between 25% and 50% load, with turn-off at smaller percent loads (approximately 25%) for high-power converters (e.g. 1 kW), and turn-off at larger percent loads (approximately 50%) for low-power converters (e.g. 200 W).

In some embodiments, the multi-phase quasi-resonant power converters are used in high-power level applications, for example at power levels of 1 kilowatt or higher. It is understood that the multi-phase quasi-resonant power converters can be used in applications at any power level.

The present invention has been described in terms of specific embodiments incorporating details to facilitate the understanding of the principles of construction and operation of the invention. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A power converter comprising:
   a. an input power supply configured to provide a supply current;
   b. a plurality of quasi-resonant converters each comprising a plurality of switches and coupled in parallel to the input power supply such that the supply current is input to each of the plurality of quasi-resonant converters;
   c. a controller coupled to the plurality of switches of each of the plurality of quasi-resonant converters, wherein the controller is configured to operate with a dead-time delay and to generate independent drive signals that include the dead-time delay, the drive signals are selectively output to each of the plurality of switches of the plurality of quasi-resonant converters, wherein each of the plurality of switches of the plurality of quasi-resonant converters is configured to receive one or more of the drive signals and to form a modified supply current in response to the received one or more drive signals thereby forming a plurality of modified supply currents, wherein the modified supply current of each of the plurality of quasi-resonant converters includes the dead-time delay and is phase-shifted relative to each other modified supply current of the plurality of modified supply currents, further wherein the plurality of quasi-resonant converters are configured to perform a power conversion function on the plurality of modified supply currents, further wherein the dead-time delay is substantially a midpoint between a minimum dead-time period that still enables zero voltage switching of the plurality of switches and a maximum dead-time period that still enables zero voltage switching of the plurality of switches; and
   d. an output capacitor coupled to an output side of each of the plurality of quasi-resonant converters.

2. The power converter of claim 1 wherein each of the plurality of quasi-resonant converters is configured to operate at the same switching frequency.

3. The power converter of claim 1 wherein each of the plurality of quasi-resonant converters comprises a quasi-resonant tank and a transformer.

4. The power converter of claim 3 wherein at least one leg of each transformer is shared by all transformers.

5. The power converter of claim 3 wherein each of the plurality of quasi-resonant converters further comprises a rectifier circuit coupled between an output side of the transformer and the output capacitor.

6. The power converter of claim 1 further comprising a filter coupled to the input power supply, wherein the filter is configured to receive a power supply signal and to output the supply current to each of the multiple quasi-resonant converters.

7. The power converter of claim 1 wherein each of the plurality of quasi-resonant converters comprises one of the group consisting of a series quasi-resonance circuit, a parallel quasi-resonance circuit, and a series-parallel quasi-resonance circuit.

8. The power converter of claim 1 wherein each of the plurality of quasi-resonant converters comprises one of the group consisting of a half-bridge quasi-resonant converter, a full-bridge quasi-resonant converter, and a push-pull quasi-resonant converter.

9. The power converter of claim 1 wherein each of the plurality of quasi-resonant converters are configured as a buck-type converter.

10. The power converter of claim 1 wherein the plurality of quasi-resonant converters comprise three quasi-resonant converters, and the plurality of modified supply currents comprise a first modified supply current formed by a first quasi-resonant converter, a second modified supply current formed by a second quasi-resonant converter and phase-shifted substantially 60 degrees relative to the first modified supply current, and a third modified supply current formed by a third quasi-resonant converter and phase-shifted substantially 120 degrees relative to the first modified supply current.

11. The power converter of claim 1 wherein the plurality of quasi-resonant converters comprise two quasi-resonant converters, and the plurality of modified supply currents comprise two supply currents including a first modified supply current formed by a first quasi-resonant converter, and a second modified supply current formed by a second quasi-resonant converter and phase-shifted substantially 90 degrees relative to the first supply current.

12. The power converter of claim 1 wherein the plurality of quasi-resonant converters comprise four quasi-resonant converters, and the plurality of modified supply currents comprise a first modified supply current formed by a first quasi-resonant converter, a second modified supply current formed by a second quasi-resonant converter, a third modified supply current formed by a third quasi-resonant converter, and a fourth modified supply current formed by a fourth quasi-resonant converter.

13. The power converter of claim 1 wherein the midpoint is identified by the controller.

14. The power converter of claim 1 wherein the controller always utilizes the midpoint as the dead-time delay.

15. A power converter comprising:
   a. an input power supply configured to provide a supply current;
   b. a plurality of quasi-resonant converters coupled in parallel to the input power supply such that the supply current is input to each of the plurality of quasi-resonant converters;
   c. a controller coupled to the plurality of quasi-resonant converters, wherein the controller is configured to operate with a dead-time delay and to generate independent drive signals that include the dead-time delay, the drive signals are selectively output to each of the plurality of the quasi-resonant converters, wherein each of the plurality of quasi-resonant converters is configured to receive one or more of the drive signals and to form a modified supply current in response to the received one or more drive signals thereby forming a plurality of modified supply currents, wherein the modified supply current of each of the plurality of the quasi-resonant converters includes the dead-time delay and is phase-shifted relative to each other modified supply current, further wherein the plurality of quasi-resonant converters are configured to perform a power conversion function on the plurality of modified supply currents, further wherein the dead-time delay is substantially a midpoint between a maximum time delay that enables a zero crossing and a minimum time delay that enables a zero crossing; and
   d. an output capacitor coupled to an output side of each of the plurality of quasi-resonant converters;

wherein the plurality of quasi-resonant converters comprise four quasi-resonant converters, and the plurality of modified supply currents comprise a first modified supply current formed by a first quasi-resonant converter, a second modified supply current formed by a second quasi-resonant converter and phase-shifted substantially 45 degrees relative to the first modified supply current, a third modified supply current formed by a third quasi-resonant converter and phase-shifted substantially 90 degrees relative to the first modified supply current, and a fourth modified supply current formed by a fourth quasi-resonant converter and phase-shifted substantially 135 degrees relative to the first modified supply current.

* * * * *